(12) United States Patent
Wuillaume et al.

(10) Patent No.: US 8,940,399 B2
(45) Date of Patent: Jan. 27, 2015

(54) COATED ARTICLE WITH LOW-E COATING HAVING LOW VISIBLE TRANSMISSION

(71) Applicant: Guardian Industries Corp., Auburn Hills, MI (US)

(72) Inventors: Francis Wuillaume, Victor, NY (US); Muhammad Imran, Brownstown, MI (US); Afonso Kreling, Rio de Janeiro (BR); Brent Boyce, Novi, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 295 days.

(21) Appl. No.: 13/644,320

(22) Filed: Oct. 4, 2012

(65) Prior Publication Data

US 2014/0098415 A1 Apr. 10, 2014

(51) Int. Cl.
| | |
|---|---|
| *B32B 15/04* | (2006.01) |
| *B32B 17/06* | (2006.01) |
| *C23C 14/18* | (2006.01) |
| *G02B 5/08* | (2006.01) |
| *G02B 1/10* | (2006.01) |
| *C03C 17/36* | (2006.01) |

(52) U.S. Cl.
CPC ............... *G02B 5/0875* (2013.01); *G02B 1/10* (2013.01); *C03C 17/3626* (2013.01); *C03C 17/3639* (2013.01); *C03C 17/3644* (2013.01); *C03C 17/3652* (2013.01); *C03C 17/366* (2013.01); *C03C 17/3681* (2013.01)
USPC ........... 428/434; 428/432; 428/433; 428/688; 428/689; 428/699; 428/698; 428/701; 428/702; 428/704; 204/192.1

(58) Field of Classification Search
USPC ......... 428/428, 432, 433, 434, 688, 689, 698, 428/699, 701, 702, 704; 204/192.1
See application file for complete search history.

(56) References Cited

U.S. PATENT DOCUMENTS

| | | | |
|---|---|---|---|
| 5,557,462 A * | 9/1996 | Hartig et al. .................. 359/585 |
| 6,692,831 B2 | 2/2004 | Stachowiak |
| 6,730,352 B2 | 5/2004 | Stachowiak |
| 6,782,718 B2 | 8/2004 | Lingle et al. |
| 7,090,921 B2 * | 8/2006 | Stachowiak .................. 428/428 |
| 7,226,528 B2 * | 6/2007 | Laird et al. ............... 204/192.27 |
| 7,314,668 B2 * | 1/2008 | Lingle et al. .................. 428/432 |
| 7,521,096 B2 | 4/2009 | Lemmer et al. |
| 7,879,448 B2 | 2/2011 | Dietrich et al. |
| 8,142,622 B2 | 3/2012 | Ferreira et al. |
| 8,173,263 B2 * | 5/2012 | Lingle et al. .................. 428/432 |
| 8,263,227 B2 | 9/2012 | Disteldorf et al. |
| 8,551,300 B2 * | 10/2013 | Stachowiak ............. 204/192.27 |
| 2003/0194570 A1 * | 10/2003 | Lingle et al. .................. 428/432 |
| 2006/0046018 A1 | 3/2006 | Lemmer et al. |
| 2006/0046074 A1 * | 3/2006 | Ferreira et al. ................. 428/432 |
| 2009/0068447 A1 * | 3/2009 | Blacker et al. ................. 428/336 |

(Continued)

*Primary Examiner* — David Simple
*Assistant Examiner* — Lauren Colgan
(74) *Attorney, Agent, or Firm* — Nixon & Vanderhye P.C.

(57) ABSTRACT

This invention relates to a coated article including a low-emissivity (low-E) coating. In certain example embodiments, the low-E coating is provided on a substrate (e.g., glass substrate) and includes at least first and second infrared (IR) reflecting layers (e.g., silver based layers) that are spaced apart by contact layers (e.g., NiCr based layers) and a dielectric layer of or including a material such as silicon nitride. In certain example embodiments, the coated article has a low visible transmission (e.g., no greater than 50%, more preferably no greater than about 40%, and most preferably no greater than about 39%).

30 Claims, 3 Drawing Sheets

(56) References Cited

U.S. PATENT DOCUMENTS

| | | | |
|---|---|---|---|
| 2009/0181245 A1* | 7/2009 | Maschwitz | 428/336 |
| 2012/0094111 A1* | 4/2012 | Laird et al. | 428/333 |
| 2012/0219821 A1* | 8/2012 | Frank et al. | 428/630 |
| 2012/0225224 A1* | 9/2012 | Blacker et al. | 428/34 |
| 2012/0225317 A1* | 9/2012 | Imran et al. | 428/630 |
| 2012/0308811 A1* | 12/2012 | Roquiny et al. | 428/336 |
| 2012/0321867 A1* | 12/2012 | Glenn et al. | 428/216 |
| 2014/0098415 A1* | 4/2014 | Wuillaume et al. | 359/360 |

* cited by examiner

COATED ARTICLE WITH LOW-E COATING HAVING LOW VISIBLE TRANSMISSION

This invention relates to a coated article including a low-emissivity (low-E) coating. In certain example embodiments, the low-E coating is provided on a substrate (e.g., glass substrate) and includes at least first and second infrared (IR) reflecting layers (e.g., silver based layers) that are spaced apart by contact layers (e.g., NiCr based layers) and a dielectric layer of or including a material such as silicon nitride. In certain example embodiments, the coated article has a low visible transmission (e.g., no greater than 50%, more preferably no greater than about 42%, and most preferably no greater than about 39%). In certain example embodiments, the coated article may be heat treated (e.g., thermally tempered and/or heat bent), and is designed to be substantially thermally stable upon heat treatment (HT) in that its $\Delta E^*$ value (glass side reflective) due to HT is no greater than 4.6, and more preferably no greater than 3.6. Coated articles according to certain example embodiments of this invention may be used in the context of insulating glass (IG) window units, vehicle windows, other types of windows, or in any other suitable application.

BACKGROUND OF THE INVENTION

Coated articles are known in the art for use in window applications such as insulating glass (IG) window units, vehicle windows, and/or the like. It is known that in certain instances, it is desirable to heat treat (e.g., thermally temper, heat bend and/or heat strengthen) such coated articles for purposes of tempering, bending, or the like. Heat treatment (HT) of coated articles typically requires use of temperature(s) of at least 580 degrees C., more preferably of at least about 600 degrees C. and still more preferably of at least 620 degrees C. Such high temperatures (e.g., for 5-10 minutes or more) often cause coatings to break down and/or deteriorate or change in an unpredictable manner. Thus, it is desirable for coatings to be able to withstand such heat treatments (e.g., thermal tempering), if desired, in a predictable manner that does not significantly damage the coating.

In certain situations, designers of coated articles strive for a combination of desirable visible transmission, desirable color, low emissivity (or emittance), and low sheet resistance ($R_s$). Low-emissivity (low-E) and low sheet resistance characteristics permit such coated articles to block significant amounts of IR radiation so as to reduce for example undesirable heating of vehicle or building interiors.

U.S. Pat. No. 7,521,096, incorporated herein by reference, discloses a low-E coating which uses zinc oxide (ZnO) contact layers below the silver-based IR reflecting layers, and above the bottom silver (Ag) based IR reflecting layer uses a $NiCrO_x$ contact layer followed by a center tin oxide ($SnO_2$) dielectric layer. While the ZnO contact layers below the silver IR reflecting layers provide good structural properties for the growth of silver, the ZnO has been found to degrade the chemical, environmental and mechanical durability of the coating in certain instances. Moreover, the thick $SnO_2$ dielectric layer has been found to show micro crystallization and stress upon HT which causes rough interfaces between the $SnO_2$, the ZnO and the Ag, which can lead to degradation of durability and affect transmitted color.

U.S. Pat. No. 5,557,462 discloses a low-E coating with a layer stack of SiN/NiCr/Ag/NiCr/SiN/NiCr/Ag/NiCr/SiN. However, the coated article of the '462 patent is designed for a high visible transmission of at least 63%. Lower visible transmissions are often desirable. Moreover, as largely explained in U.S. Pat. No. 8,173,263, coated articles of the '462 patent are not heat treatable because upon heat treatment sheet resistance ($R_s$) goes way up such as from about 3-5 to well over 10, haze tends to set in, and the glass side reflective $\Delta E^*$ value is undesirable because it is over 5.0.

Accordingly, it would be desirable to provided a coated article that is characterized by one or more of: (i) low visible transmission, (ii) good durability, and (iii) thermal stability upon HT so as to realize a glass side reflective $\Delta E^*$ value no greater than about 4.6, more preferably no greater than about 3.6.

The term $\Delta E^*$ (and $\Delta E$) is well understood in the art and is reported, along with various techniques for determining it, in ASTM 2244-93 as well as being reported in Hunter et. al., *The Measurement of Appearance*, $2^{nd}$ Ed. Cptr. 9, page 162 et seq. [John Wiley & Sons, 1987]. As used in the art, $\Delta E^*$ (and $\Delta E$) is a way of adequately expressing the change (or lack thereof) in reflectance and/or transmittance (and thus color appearance, as well) in an article after or due to heat treatment. $\Delta E$ may be calculated by the "ab" technique, or by the Hunter technique (designated by employing a subscript "H"). $\Delta E$ corresponds to the Hunter Lab L, a, b scale (or $L_h$, $a_h$, $b_h$). Similarly, $\Delta E^*$ corresponds to the CIE LAB Scale $L^*$, $a^*$, $b^*$. Both are deemed useful, and equivalent for the purposes of this invention. For example, as reported in Hunter et. al. referenced above, the rectangular coordinate/scale technique (CIE LAB 1976) known as the $L^*$, $a^*$, $b^*$ scale may be used, wherein: $L^*$ is (CIE 1976) lightness units; $a^*$ is (CIE 1976) red-green units; $b^*$ is (CIE 1976) yellow-blue units; and the distance $\Delta E^*$ between $L^*_o$ $a^*_o$ $b^*_o$ and $L^*_1$ $a^*_1$ $b^*_1$ is: $\Delta E^* = [(\Delta L^*)^2 + (\Delta a^*)^2 + (\Delta b^*)^2]^{1/2}$, where: $\Delta L^* = L^*_1 - L^*_o$; $\Delta a^* = a^*_1 - a^*_o$; $\Delta b^* = b^*_1 - b^*_o$; where the subscript "o" represents the coating (coated article) before heat treatment and the subscript "1" represents the coating (coated article) after heat treatment; and the numbers employed (e.g., $a^*$, $b^*$, $L^*$) are those calculated by the aforesaid (CIE LAB 1976) $L^*$, $a^*$, $b^*$ coordinate technique. When, for example, glass side reflective $\Delta E^*$ values are measured, then glass side reflective $a^*$, $b^*$ and $L^*$ values are used. In a similar manner, $\Delta E$ may be calculated using the above equation for $\Delta E^*$, i.e., $\Delta E^* = [(\Delta L^*)^2 + (\Delta a^*)^2 + (\Delta b^*)^2]^{1/2}$, by replacing $a^*$, $b^*$, $L^*$ with Hunter Lab values $a_h$, $b_h$, $L_h$. Also within the scope of this invention and the quantification of $\Delta E^*$ are the equivalent numbers if converted to those calculated by any other technique employing the same concept of $\Delta E^*$ as defined above.

BRIEF SUMMARY OF EXAMPLE EMBODIMENTS OF THE INVENTION

This invention relates to a coated article including a low-emissivity (low-E) coating. In certain example embodiments, the low-E coating is provided on a substrate (e.g., glass substrate) and includes at least first and second infrared (IR) reflecting layers (e.g., silver based layers) that are spaced apart by contact layers (e.g., NiCr based layers) and a dielectric layer of or including a material such as silicon nitride. In certain example embodiments, the coated article has a low visible transmission (e.g., no greater than 50%, more preferably no greater than about 42%, more preferably no greater than about 40%, and most preferably no greater than about 39%). In certain example embodiments, the coated article may be heat treated (e.g., thermally tempered and/or heat bent), and is designed to be substantially thermally stable upon heat treatment (HT) in that its $\Delta E^*$ value (glass side reflective) due to HT is no greater than 4.6, more preferably no greater than 3.6. Such a low $\Delta E^*$ value indicates that the coated article has approximately the same transmission and color characteristics as viewed by the naked eye both before and after heat treatment (e.g., thermal tempering). Coated articles according to certain example embodiments of this invention may be used in the context of insulating glass (IG) window units, vehicle windows, other types of windows, or in any other suitable application.

It is desired to provide a coated article that is characterized by one, two, or all three of: (i) low visible transmission, (ii) good durability, and (iii) thermal stability upon HT so as to realize a glass side reflective ΔE* value no greater than 4.6, more preferably no greater than 3.6.

In certain example embodiments of this invention, there is provided a coated article including a coating supported by a glass substrate, comprising: first and second infrared (IR) reflecting layers comprising silver, the first IR reflecting layer being located closer to the glass substrate than is the second IR reflecting layer; a first contact layer comprising NiCr located over and directly contacting the first IR reflecting layer comprising silver; a dielectric layer comprising silicon nitride located over and directly contacting the first contact layer comprising NiCr; a second contact layer comprising NiCr located over and directly contacting the layer comprising silicon nitride; the second IR reflecting layer comprising silver located over and directly contacting the second contact layer comprising NiCr; and wherein the second IR reflecting layer comprising silver is at least 10 angstroms (Å) thinner than the first IR reflecting layer comprising silver, and wherein the coated article has a visible transmission of no greater than 50%.

DETAILED DESCRIPTION OF EXAMPLE EMBODIMENTS OF THE INVENTION

Coated articles herein may be used in applications such as IG window units, laminated window units (e.g., for use in vehicle or building applications), vehicle windows, monolithic architectural windows, residential windows, and/or any other suitable application that includes single or multiple glass substrates.

Figure 1:
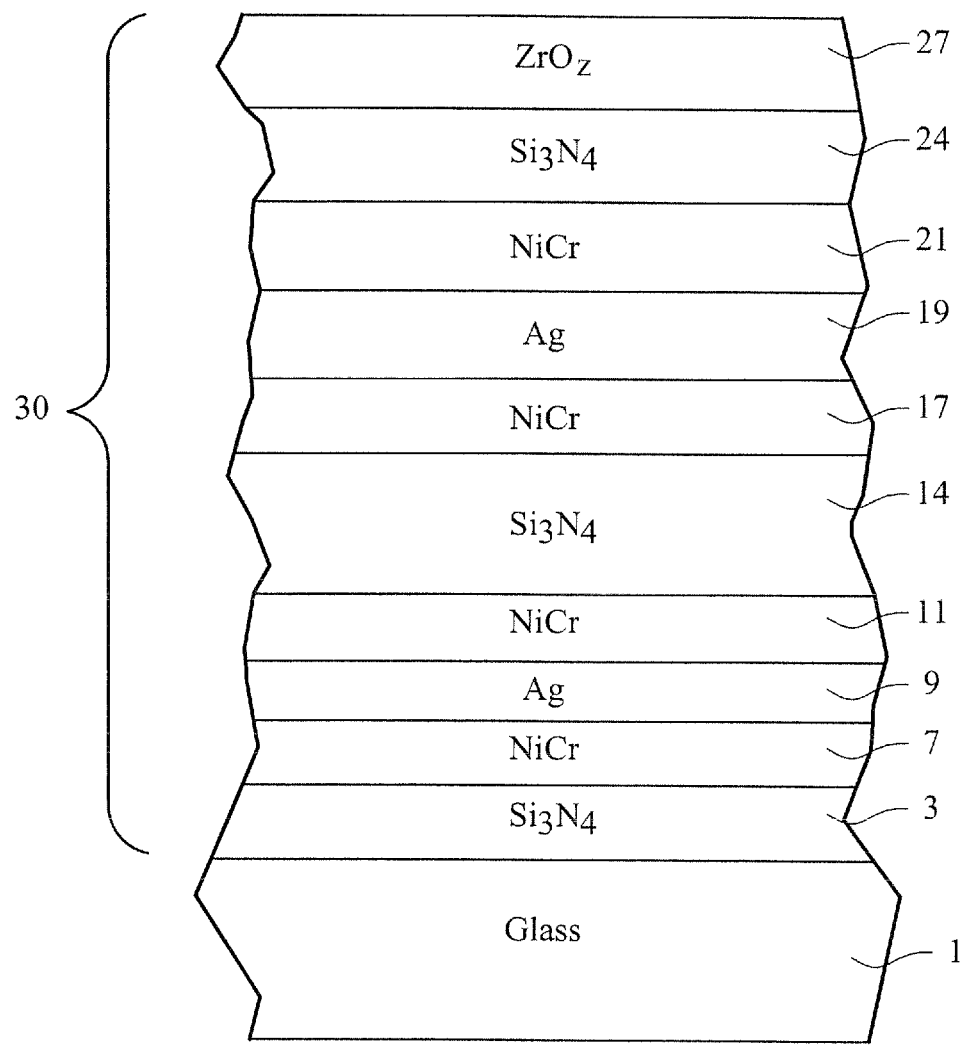
FIG. 1 is a cross sectional view of a coated article according to an example embodiment of this invention.

In certain example embodiments of this invention, the coating includes a double-silver stack, although this invention is not so limited in all instances. Referring to FIG. 1 for example, in certain example embodiments of this invention, there is provided a coated article including a coating supported by a glass substrate, the coating comprising: first 9 and second 19 infrared (IR) reflecting layers comprising silver, the first IR reflecting layer 9 being located closer to the glass substrate 1 than is the second IR reflecting layer 19; a first contact layer comprising NiCr 11 located over and directly contacting the first IR reflecting layer comprising silver 9; a dielectric layer comprising silicon nitride 14 located over and directly contacting the first contact layer comprising NiCr 11; a second contact layer comprising NiCr 17 located over and directly contacting the layer comprising silicon nitride 14; the second IR reflecting layer comprising silver 19 located over and directly contacting the second contact layer comprising NiCr 17; and wherein the second IR reflecting layer comprising silver 19 is at least 10 angstroms (Å) thinner than the first IR reflecting layer comprising silver 9, and wherein the coated article has a visible transmission of no greater than 50%.

In order to increase durability, along with optics and thermal properties, and avoid significant structural changes before and after HT, coated articles according to certain example embodiments of this invention have a center dielectric layer 14 of or including silicon nitride and lower contact layers 7, 17 are based on NiCr (as opposed to ZnO). It has also been found that using metallic or substantially metallic NiCr (possibly partly nitrided) for layer(s) 7, 11, 17 and/or 21 improves chemical, mechanical and environmental durability (compared to using ZnO lower contact layers below silver and/or highly oxided NiCr upper contact layers above silver). It has also been found that sputter-depositing silicon nitride inclusive layer 14 in an amorphous state, so that it is amorphous in both as-coated and HT states, helps with overall stability of the coating. For example, 5% HCl at 65 degrees C. for one hour will remove the coating of U.S. Pat. No. 7,521,096, whereas the coating shown in FIG. 1 and the examples herein will survive this HCl test. And in high temperature and high humidity environment, there is less damage to the coating of FIG. 1 and the examples herein after ten days of exposure, than to the coating of the '096 patent after two days of exposure. And regarding high corrosive chemicals such as those used for "brick wash", corrosion resistance is such that edge deletion need not be performed in certain example IG and laminated embodiments. Similarly, for mechanical abrasion tests, thermal cycling and salt fog tests, the coatings of the examples herein were found to be better than that of the '096 patent. Moreover, it has been found that making the top Ag based IR reflecting layer 19 substantially thinner than the bottom Ag based IR reflecting layer 9 improves corrosion resistance and improves slightly solar performance. The coating can be used as-coated, or heat treated, due to the relatively low ΔE* values discussed herein. For example, when the coating 30 is located surface #2 of an IG window unit, low glass side reflective ΔE* values due to heat treatment indicate that the coated article has approximately the same transmission and color characteristics as viewed by the naked eye both before and after heat treatment (e.g., thermal tempering), and thus can be used either as-coated or as heat treated without significantly affecting optical characteristics thereof.

In certain example embodiments of this invention such as FIG. 1, heat treated or non-heat-treated coated articles having multiple IR reflecting layers (e.g., two spaced apart silver based layers) are capable of realizing a sheet resistance ($R_s$) of less than or equal to 5.0 (more preferably less than or equal to 4.0, even more preferably less than or equal to 3.0). The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes. The coated article may or may not be heat treated in different embodiments of this invention.

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and low-E coating (or layer system) 30 provided on the substrate 1 either directly or indirectly. The coating (or layer system) 30 includes, for example: bottom dielectric silicon nitride layer 3 which may be $Si_3N_4$, or of the Si-rich type silicon nitride for haze reduction, or of any other suitable stoichiometry silicon nitride in different embodiments of this invention, lower contact layer 7 (which contacts bottom IR reflecting layer 9), first conductive and preferably metallic or substantially metallic infrared (IR) reflecting layer 9, upper contact layer 11 (which contacts layer 9), dielectric silicon nitride based and/or inclusive layer 14, lower contact layer 17 (which contacts IR reflecting layer 19), second conductive and preferably metallic or substantially metallic IR reflecting layer 19, upper contact layer 21 (which contacts layer 19), dielectric silicon nitride layer 24 which may be $Si_3N_4$, of the Si-rich type for haze reduction, or of any other suitable stoichiometry silicon nitride in different embodiments of this invention, and overcoat layer 27 of or including a material such as zirconium oxide (e.g., $ZrO_2$). The "contact" layers 7, 11, 17 and 21 each contact an IR reflecting layer (e.g., layer based on Ag). The aforesaid layers 3-27 make up low-E (i.e., low emissivity) coating 30 that is provided on glass or plastic substrate 1. Layers 3-27 may be sputter-deposited on the substrate 1 in certain example embodiments of this invention, with each layer being sputter-deposited in vacuum using one or more targets as needed (the sputtering targets may be ceramic or metallic). Metallic layers may be sputtered in an atmosphere containing argon gas, whereas nitrided layers may be sputtered in an atmosphere containing a mixture of nitrogen and argon gas.

Figure 2:
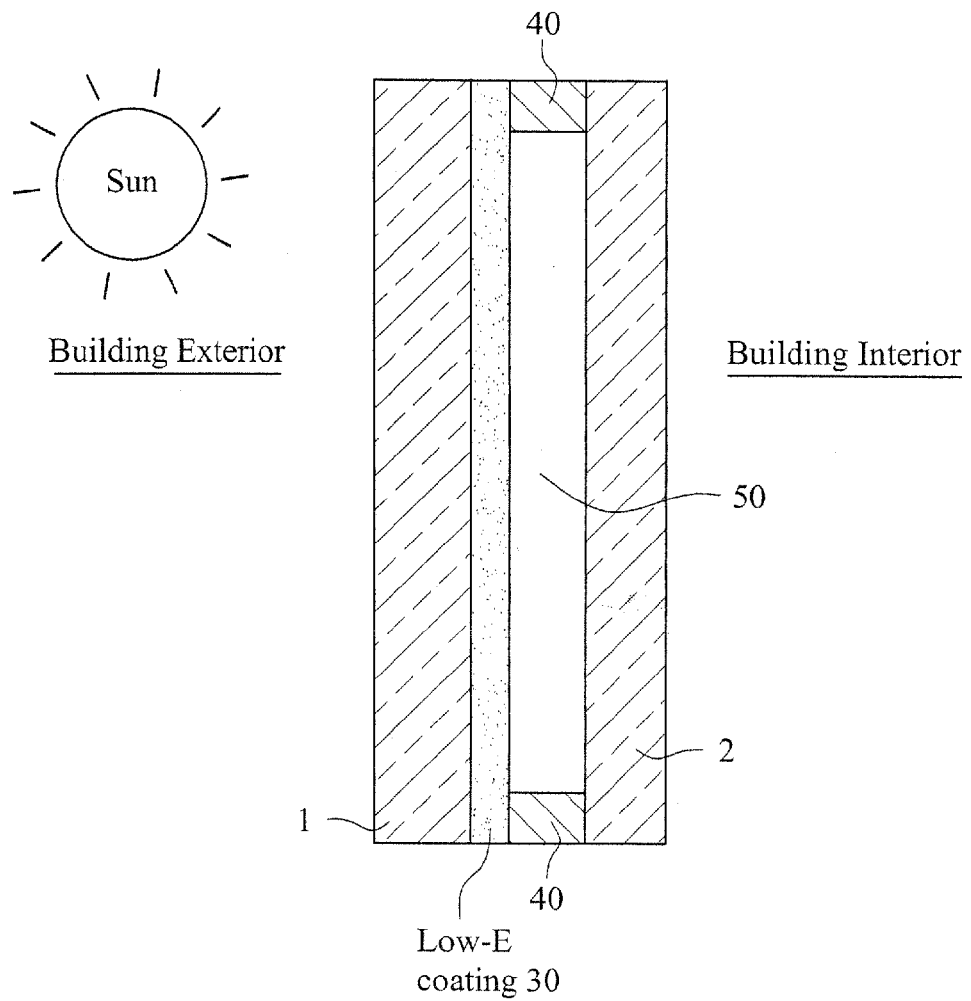
FIG. 2 is a cross sectional view showing the coated article of FIG. 1 provided in an IG window unit according to an example embodiment of this invention.

In monolithic instances, the coated article includes only one glass substrate 1 as illustrated in FIG. 1. However, monolithic coated articles herein may be used in devices such as laminated vehicle windshields, IG window units, and the like. As for IG window units, an IG window unit may include two spaced apart glass substrates. An example IG window unit is illustrated and described, for example, in U.S. Patent Document No. 2004/0005467, the disclosure of which is hereby incorporated herein by reference. FIG. 2 shows an example IG window unit including the coated glass substrate 1 shown in FIG. 1 coupled to another glass substrate 2 via spacer(s), sealant(s) 40 or the like, with a gap 50 being defined therebetween. This gap 50 between the substrates in IG window unit embodiments may in certain instances be filled with a gas such as argon (Ar). An example IG unit may comprise a pair of spaced apart clear glass substrates each about 3-4 mm thick, one of which is coated with a coating 30 herein in certain example instances, where the gap 50 between the substrates may be from about 5 to 30 mm, more preferably from about 10 to 20 mm, and most preferably about 16 mm. In certain example instances, the low-E coating 30 may be provided on the interior surface of either substrate facing the gap (the coating is shown on the interior major surface of substrate 1 in FIG. 2 facing the gap 50, but instead could be on the interior major surface of substrate 2 facing the gap 50). Either substrate 1 or substrate 2 may be the outermost substrate of the IG window unit at the building exterior (e.g., in FIG. 2 the substrate 1 is the substrate closest to the building exterior, and the coating 30 is provided on surface #2 of the IG window unit).

Figure 3:
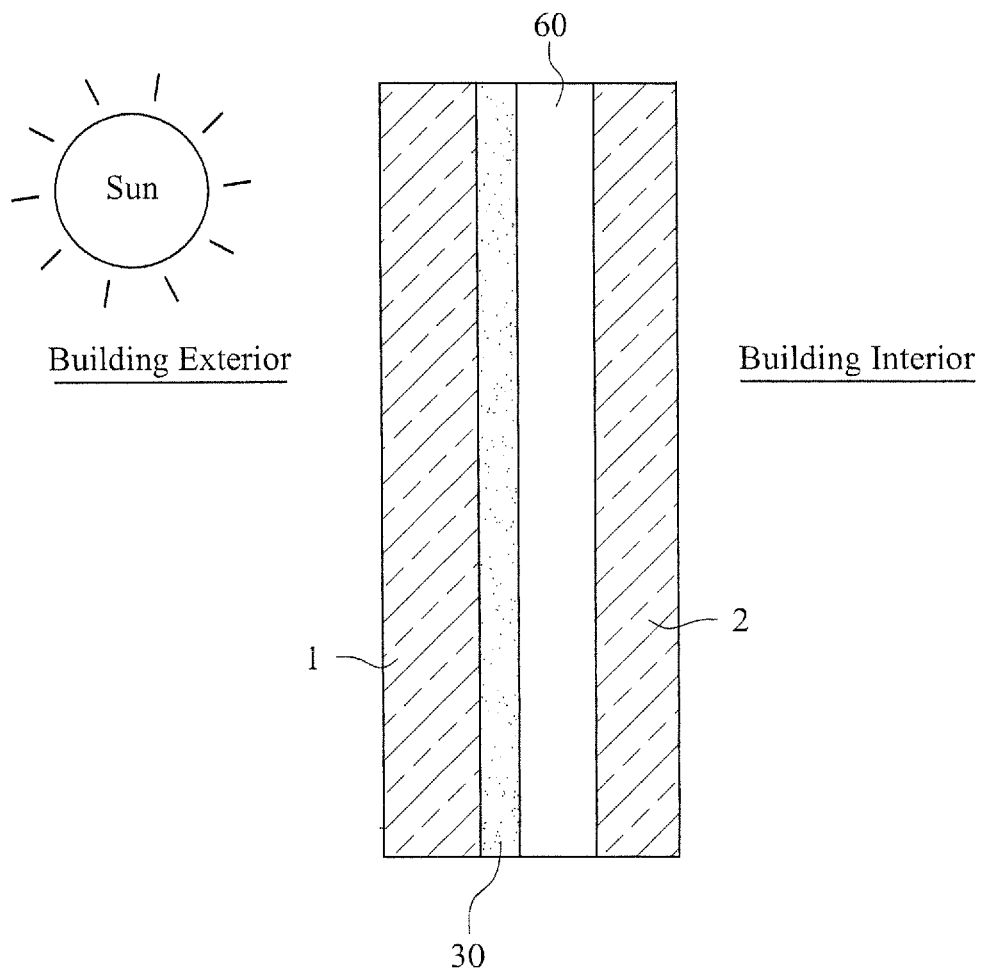
FIG. 3 is a cross sectional view showing the coated article of FIG. 1 provided in a laminated window unit according to an example embodiment of this invention.

FIG. 3 shows a laminated window unit including the coated glass substrate 1 shown in FIG. 1 coupled to another glass substrate 2 via laminating film (e.g., PVB) 60. As shown in FIG. 3, the low-E coating 0 may abut the laminating film 60 in such products.

In certain example embodiments of this invention, one, two, three, or all four of contact layers 7, 11, 17, 21 may be of or include NiCr (any suitable ratio or Ni:Cr), and may or may not be nitrided ($NiCrN_x$). In certain example embodiments, one, two, three or all four of these NiCr inclusive layers 7, 11, 17, 21 is substantially or entirely non-oxidized. In certain example embodiments, one, two, three or all four of NiCr based layers 7, 11, 17, 21 may comprise from 0-10% oxygen, more preferably from 0-5% oxygen, and most preferably from 0-2% oxygen (atomic %). In certain example embodiments, one, two, three or all four of these layers 7, 11, 17, 21 may contain from 0-20% nitrogen, more preferably from 1-15% nitrogen, and most preferably from about 1-12% nitrogen (atomic %). While NiCr is a preferred material for the absorption layers 4 and 25, it is possible that other materials may instead or additionally be used. For example, NiCr based layers 7, 11, 17 and/or 21 may or may not be doped with other material(s) such as stainless steel, Mo, or the like. It has been found that the use of NiCr based contact layer(s) 7 and/or 17 under the silver-based IR reflecting layer(s) 9, 19 improves durability of the coated article (compared to if layers 7 and 17 were instead of ZnO).

Dielectric layers 3, 14, and 24 may be of or include silicon nitride in certain embodiments of this invention. Silicon nitride layers 3, 14 and 24 may, among other things, improve heat-treatability of the coated articles and protect the other layers during optional HT, e.g., such as thermal tempering or the like. One or more of the silicon nitride of layers 3, 14, 24 may be of the stoichiometric type (i.e., $Si_3N_4$), or alternatively of the Si-rich type of silicon nitride in different embodiments of this invention. The presence of free Si in a Si-rich silicon nitride inclusive layer 3 and/or 14 may, for example, allow certain atoms such as sodium (Na) which migrate outwardly from the glass 1 during HT to be more efficiently stopped by the Si-rich silicon nitride inclusive layer(s) before they can reach silver and damage the same. Thus, it is believed that the Si-rich $Si_xN_y$ can reduce the amount of damage done to the silver layer(s) during HT in certain example embodiments of this invention thereby allowing sheet resistance ($R_s$) to decrease or remain about the same in a satisfactory manner. Moreover, it is believed that the Si-rich $Si_xN_y$ in layers 3, 14 and/or 24 can reduce the amount of damage (e.g., oxidation) done to the silver and/or NiCr during HT in certain example optional embodiments of this invention. In certain example embodiments, when Si-rich silicon nitride is used, the Si-rich silicon nitride layer (3, 14 and/or 24) as deposited may be characterized by $Si_xN_y$ layer(s), where x/y may be from 0.76 to 1.5, more preferably from 0.8 to 1.4, still more preferably from 0.82 to 1.2. Any and/or all of the silicon nitride layers discussed herein may be doped with other materials such as stainless steel or aluminum in certain example embodiments of this invention. For example, any and/or all silicon nitride layers discussed herein may optionally include from about 0-15% aluminum, more preferably from about 1 to 10% aluminum, in certain example embodiments of this invention. The silicon nitride may be deposited by sputtering a target of Si or SiAl, in an atmosphere having argon and nitrogen gas, in certain embodiments of this invention. Small amounts of oxygen may also be provided in certain instances in the silicon nitride layers.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics. The IR reflecting layers may, however, be slightly oxidized in certain embodiments of this invention.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses and materials may be used in layers in different embodiments of this invention, example thicknesses and materials for the respective layers on the glass substrate 1 in the FIG. 1 embodiment are as follows, from the glass substrate outwardly:

Example Materials/Thicknesses; FIG. 1 Embodiment

| Layer<br>Glass (1-10 mm thick) | Preferred<br>Range (Å) | More<br>Preferred (Å) | Example (Å) |
| --- | --- | --- | --- |
| $Si_xN_y$ (layer 3) | 100-500 Å | 250-450 Å | 339 Å |
| NiCr or NiCrN (layer 7) | 10-45 Å | 15-30 Å | 18-25 Å |
| Ag (layer 9) | 90-165 Å | 110-145 Å | 128 Å |
| NiCr or NiCrN (layer 11) | 10-45 Å | 15-30 Å | 18-25 Å |
| $Si_xN_y$ (layer 14) | 300-1400 Å | 400-1200 Å | 700-990 Å |
| NiCr or NiCrN (layer 17) | 5-22 Å | 6-14 Å | 7-11 Å |
| Ag (layer 19) | 50-115 Å | 60-95 Å | 79 Å |
| NiCr or NiCrN (layer 21) | 8-30 Å | 10-20 Å | 11-18 Å |
| $Si_3N_4$ (layer 24) | 100-500 Å | 150-290 Å | 200-260 Å |
| $ZrO_2$ (layer 27) | 25-150 Å | 35-80 Å | 50 Å |

In certain example embodiments of this invention, coated articles herein may have the following optical and solar characteristics set forth in Table 2 when measured monolithically (before and/or after optional HT). The sheet resistances ($R_s$) herein take into account all IR reflecting layers (e.g., silver layers 9, 19).

Optical/Solar Characteristics (Monolithic)

| Characteristic | General | More Preferred | Most Preferred |
| --- | --- | --- | --- |
| $R_s$ (ohms/sq.): | <=5.0 | <=4.0 | <=3.0 |
| $E_n$: | <=0.08 | <=0.05 | <=0.04 |
| $T_{vis}$ (Ill. C 2°): | 10-60% | 20-42% | 27-39% |

In certain example laminated embodiments of this invention, coated articles herein which have been optionally heat treated to an extent sufficient for tempering, and which have been coupled to another glass substrate to form an IG unit, may have the above recited Optical/Solar characteristics in a structure as shown in FIG. 2 (e.g., where the two glass sheets are 4 mm thick and 6 mm thick respectively of clear glass with a 16 mm gap therebetween filled with 90/10 argon/air). Such IG window units may have a visible transmission of from about 20-40% in certain example embodiments of this invention. Alternatively, coated articles herein which have been optionally heat treated to an extent sufficient for tempering, and which have been coupled to another glass substrate via laminating material such as PVB 60 to form a laminated window unit, may have the above recited Optical/Solar characteristics in a structure as shown in FIG. 3 (i.e., the FIG. 3 laminated structure may have the Optical/Solar characteristics recited above).

The following examples are provided for purposes of example only, and are not intended to be limiting unless specifically claimed.

Examples 1-3

The following Examples 1-3 were made via sputtering coatings on 4 mm thick clear/transparent glass substrates so as to have approximately the layer stacks set forth below. The layer thicknesses below for the examples are in units of angstroms (Å), from the glass substrate moving outwardly.

| Layer | Example 1 | Example 2 | Example 3 |
| --- | --- | --- | --- |
| $Si_xN_y$ (layer 3) | 339 Å | 343 Å | 326 Å |
| NiCr (layer 7) | 20 Å | 40 Å | 14 Å |
| Ag (layer 9) | 128 Å | 122 Å | 148 Å |
| NiCr (layer 11) | 22 Å | 22 Å | 22 Å |
| $Si_xN_y$ (layer 14) | 880 Å | 958 Å | 960 Å |
| NiCr (layer 17) | 8 Å | 8 Å | 8 Å |
| Ag (layer 19) | 79 Å | 79 Å | 79 Å |
| NiCr (layer 21) | 14 Å | 14 Å | 14 Å |
| $Si_3N_4$ (layer 24) | 235 Å | 268 Å | 238 Å |
| $ZrO_2$ (layer 27) | 50 Å | 50 Å | 50 Å |

Set forth below are the optical characteristics of Examples 1-3 measured in a laminated structure with two glass substrates as shown in FIG. 3. All values measured in the table immediately below are pre-HT, except that the ΔE* values were due to HT.

Monolithic

| Characteristic | Ex. 1 | Ex. 2 | Ex. 3 |
| --- | --- | --- | --- |
| $T_{vis}$ (or TY)(Ill. C 2°): | 39.3% | 33.7% | 37.1% |
| $a^*_t$ (Ill. C 2°): | −5.5 | −5.5 | −4.3 |
| $b^*_t$ (Ill. C 2°): | −1.3 | +2.8 | +2.8 |
| $R_fY$ (Ill. C, 2 deg.): | 13.4% | 18.9% | 22.5% |
| $a^*_f$ (Ill. C, 2°): | −9.5 | −15.5 | −18.1 |
| $b^*_f$ (Ill. C, 2°): | −23.3 | −17.2 | −11.0 |
| $R_gY$ (Ill. C, 2 deg.): | 18.3 | 22.6% | 26.0% |
| $a^*_g$ (Ill. C, 2°): | +1.1 | −4.4 | −4.0 |
| $b^*_g$ (Ill. C, 2°): | −8.6 | −4.7 | −5.4 |
| ΔE* (transmissive): | 2.8 | 2.6 | 2.7 |
| ΔE* (glass side refl.): | 4.4 | 4.3 | 3.6 |

It can be seen from the above the examples above that the coated articles measured monolithically had desirable visible transmission (e.g., in the range of from about 20-42% measured monolithically), and had fairly neutral glass side reflective color. In particular, $a^*_g$ (glass side reflective a* color) was in a desirable range of from about −5 to +3, and $b^*_g$ (glass side reflective b* color) was in a desirable range of from about −10 to +2. These are desirable characteristics, especially when the coated article is to be put in an IG window unit as shown in FIG. 2 or in a laminated window unit as shown in FIG. 3.

Set forth below are the optical characteristics of IG window units including the coated articles of Examples 1-3, namely when the coated articles are located in IG window units as shown in FIG. 2 (on surface #2 of the IG unit, so that glass side reflective values are indicative of from the outside).

IG Unit

| Characteristic | Ex. 1 | Ex. 2 | Ex. 3 |
|---|---|---|---|
| $T_{vis}$ (or TY)(Ill. C 2°): | 33.4% | 29.5% | 35.1% |
| $a*_t$ (Ill. C 2°): | −1.05 | −1.58 | −0.8 |
| $b*_t$ (Ill. C 2°): | −7.83 | −7.3 | −7.13 |
| $R_fY$ (Ill. C, 2 deg.): | 24.7% | 29.1% | 32.7% |
| $a*_f$ (Ill. C, 2°): | −17.97 | −18.3 | −17.42 |
| $b*_f$ (Ill. C, 2°): | −2.75 | 8.19 | 12.65 |
| $R_gY$ (Ill. C, 2 deg.): | 22% | 23.3% | 29% |
| $a*_g$ (Ill. C, 2°): | −2.66 | 0.98 | −2.48 |
| $b*_g$ (Ill. C, 2°): | 8.12 | 5.01 | 8.35 |

Set forth below are the optical characteristics of laminated window units including the coated articles of Examples 1-3, namely when the coated articles are located in laminated window units as shown in FIG. 3 (on surface #2 of the unit, so that glass side reflective values are indicative of from the outside).

Laminated Window Unit

| Characteristic | Ex. 1 | Ex. 2 | Ex. 3 |
|---|---|---|---|
| $T_{vis}$ (or TY)(Ill. C 2°): | 38.5% | 33.7% | 40.5% |
| $a*_t$ (Ill. C 2°): | −6.15 | −5.48 | −3.9 |
| $b*_t$ (Ill. C 2°): | −1.42 | 2.73 | 2.72 |
| $R_fY$ (Ill. C, 2 deg.): | 13.2% | 18.8% | 22.2% |
| $a*_f$ (Ill. C, 2°): | −9.84 | −15.61 | −17.57 |
| $b*_f$ (Ill. C, 2°): | −22.98 | −17.14 | −8.74 |
| $R_gY$ (Ill. C, 2 deg.): | 18% | 22.6% | 25.4% |
| $a*_g$ (Ill. C, 2°): | 0.62 | −4.34 | −3.66 |
| $b*_g$ (Ill. C, 2°): | −8.49 | −4.64 | −7.41 |

In certain example embodiments of this invention, there is provided a coated article including a coating supported by a glass substrate, the coating comprising: first 9 and second 19 infrared (IR) reflecting layers comprising silver, the first IR reflecting layer 9 being located closer to the glass substrate 1 than is the second IR reflecting layer 19; a first contact layer comprising NiCr 11 located over and directly contacting the first IR reflecting layer comprising silver 9; a dielectric layer comprising silicon nitride 14 located over and directly contacting the first contact layer comprising NiCr 11; a second contact layer comprising NiCr 17 located over and directly contacting the layer comprising silicon nitride 14; the second IR reflecting layer comprising silver 19 located over and directly contacting the second contact layer comprising NiCr 17; and wherein the second IR reflecting layer comprising silver 19 is at least 10 angstroms (Å) thinner than the first IR reflecting layer comprising silver 9, and wherein the coated article has a visible transmission of no greater than 50% (e.g., measured monolithically and/or in a laminated window structure).

In the coated article of the immediately preceding paragraph, the first contact layer comprising NiCr may be from about 10-40 Å thick, more preferably from about 15-30 Å thick, and most preferably from about 18-25 Å thick.

In the coated article of any of the preceding two paragraphs, said first contact layer comprising NiCr may be from 8-22 Å thicker than the second contact layer comprising NiCr, more preferably said first contact layer comprising NiCr may be from 10-18 Å thicker than the second contact layer comprising NiCr.

In the coated article of any of the preceding three paragraphs, the second contact layer comprising NiCr may be from about 5-22 Å thick, more preferably from about 6-14 Å thick, and most preferably from about 7-11 Å thick.

In the coated article of any of the preceding four paragraphs, the second IR reflecting layer comprising silver may be at least 20 angstroms (Å) thinner (more preferably at least 40 angstroms thinner) than the first IR reflecting layer comprising silver.

In the coated article of any of the preceding five paragraphs, the dielectric layer comprising silicon nitride 14 may be amorphous.

In the coated article of any of the preceding six paragraphs, the first contact layer comprising NiCr and/or the second contact layer comprising NiCr may be substantially metallic or metallic and contain no more than about 5% (atomic %) oxygen.

In the coated article of any of the preceding seven paragraphs, said first and/or second contact layer may further contain nitrogen (e.g., from about 1-10%, atomic %, nitrogen).

In the coated article of any of the preceding eight paragraphs, said coated article may have a visible transmission of from about 20-40% (more preferably from about 27-39%) measured monolithically.

The coated article of any of the preceding nine paragraphs may or may not be heat treated (e.g., thermally tempered). When heat treated, the coated article may have a glass side reflective $\Delta E^*$ value of no greater than 4.6 (more preferably no greater than 3.6, and possibly from 3.0 to 4.6) due to the heat treatment.

In the coated article of any of the preceding ten paragraphs, the coating may further include another dielectric layer 24 comprising silicon nitride located over at least the second IR reflecting layer 19. The another dielectric layer 24 comprising silicon nitride may be from 150-290 Å thick. An overcoat comprising zirconium oxide 27 may be located over and directly contacting the another dielectric layer comprising silicon nitride 24.

In the coated article of any of the preceding eleven paragraphs, the coating may further include a bottom layer comprising silicon nitride 3 located on and directly contacting the glass substrate 1, and another contact layer comprising NiCr 7 located between and directly contacting the bottom layer comprising silicon nitride 3 and the first IR reflecting layer comprising silver 9.

In the coated article of any of the preceding twelve paragraphs, the first IR reflecting layer comprising silver may be from 110-145 Å thick.

In the coated article of any of the preceding thirteen paragraphs, the second IR reflecting layer comprising silver may be from 60-95 Å thick.

In the coated article of any of the preceding fourteen paragraphs, the coating may have a sheet resistance of less than or equal to 4.0 ohms/square.

The coated article of any of the preceding fifteen paragraphs, when heat treated, may have a transmissive $\Delta E^*$ value of from 2.0 to 3.2.

The coated article of any of the preceding sixteen paragraphs may be provided in an IG window unit, or in a laminated window unit in which the coated substrate is laminated to another glass substrate.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising:
   first and second infrared (IR) reflecting layers comprising silver, the first IR reflecting layer being located closer to the glass substrate than is the second IR reflecting layer;
   a first contact layer comprising NiCr located over and directly contacting the first IR reflecting layer comprising silver;
   a dielectric layer comprising silicon nitride located over and directly contacting the first contact layer comprising NiCr;
   a second contact layer comprising NiCr located over and directly contacting the layer comprising silicon nitride;
   the second IR reflecting layer comprising silver located over and directly contacting the second contact layer comprising NiCr; and
   wherein the second IR reflecting layer comprising silver is at least 10 angstroms (Å) thinner than the first IR reflecting layer comprising silver, and wherein the coated article has a visible transmission of no greater than 50%.

2. The coated article of claim 1, wherein the first contact layer comprising NiCr is from about 15-30 Å thick.

3. The coated article of claim 1, wherein said first contact layer comprising NiCr is from 8-22 Å thicker than the second contact layer comprising NiCr.

4. The coated article of claim 1, wherein said first contact layer comprising NiCr is from 10-18 Å thicker than the second contact layer comprising NiCr.

5. The coated article of claim 1, wherein the second contact layer comprising NiCr is from about 6-14 Å thick.

6. The coated article of claim 1, wherein the second IR reflecting layer comprising silver is at least 20 angstroms (Å) thinner than the first IR reflecting layer comprising silver.

7. The coated article of claim 1, wherein the second IR reflecting layer comprising silver is at least 40 angstroms (Å) thinner than the first IR reflecting layer comprising silver.

8. The coated article of claim 1, wherein the dielectric layer comprising silicon nitride is amorphous.

9. The coated article of claim 1, wherein the first contact layer comprising NiCr is substantially metallic or metallic and contains no more than about 5% (atomic %) oxygen.

10. The coated article of claim 1, wherein the second contact layer comprising NiCr is substantially metallic or metallic and contains no more than about 5% (atomic %) oxygen.

11. The coated article of claim 1, wherein said first and/or second contact layer further contains nitrogen.

12. The coated article of claim 1, wherein said coated article has a visible transmission of from about 20-42% measured monolithically.

13. The coated article of claim 1, wherein the coated article is thermally tempered.

14. The coated article of claim 1, wherein the coated article is not heat treated.

15. The coated article of claim 1, wherein the coated article is heat treated and has a glass side reflective $\Delta E^*$ value of no greater than 4.6 due to the heat treatment.

16. The coated article of claim 1, wherein the coated article is heat treated and has a glass side reflective $\Delta E^*$ value of no greater than 3.6 due to the heat treatment.

17. The coated article of claim 1, wherein the coated article is heat treated and has a glass side reflective $\Delta E^*$ value of from 3.0 to 4.6 due to the heat treatment.

18. The coated article of claim 1, wherein the coating further comprises another dielectric layer comprising silicon nitride located over at least the second IR reflecting layer.

19. The coated article of claim 18, wherein said another dielectric layer comprising silicon nitride is from 150-290 Å thick.

20. The coated article of claim 18, wherein the coating further comprises an overcoat comprising zirconium oxide located over and directly contacting the another dielectric layer comprising silicon nitride.

21. The coated article of claim 1, wherein the coating further comprising a bottom layer comprising silicon nitride located on and directly contacting the glass substrate, and another contact layer comprising NiCr located between and directly contacting the bottom layer comprising silicon nitride and the first IR reflecting layer comprising silver.

22. The coated article of claim 1, wherein the first IR reflecting layer comprising silver is from 110-145 Å thick, and the second IR reflecting layer comprising silver is from 60-95 Å thick.

23. The coated article of claim 1, wherein the coating has a sheet resistance ($R_s$) of less than or equal to 4.0 ohms/square.

24. A laminated window comprising the coated article of claim 1 laminated to another substrate.

25. A coated article including a coating supported by a glass substrate, comprising:
   first and second infrared (IR) reflecting layers, the first IR reflecting layer being located closer to the glass substrate than is the second IR reflecting layer;
   a first substantially metallic contact layer comprising NiCr located over and directly contacting the first IR reflecting layer, the first substantially metallic contact layer comprising NiCr being from about 15-30 Å thick;
   a dielectric layer comprising silicon nitride located over and directly contacting the first contact layer comprising NiCr;
   a second substantially metallic contact layer comprising NiCr located over and directly contacting the layer comprising silicon nitride;
   the second IR reflecting layer located over and directly contacting the second contact layer comprising NiCr; and
   wherein the second IR reflecting layer comprising silver is at least 10 angstroms (Å) thinner than the first IR reflecting layer comprising silver, and wherein the coated article has a visible transmission of no greater than 50%.

26. The coated article of claim 25, wherein said first contact layer comprising NiCr is from 8-22 Å thicker than the second contact layer comprising NiCr.

27. The coated article of claim 25, wherein the second IR reflecting layer comprising silver is at least 40 angstroms (Å) thinner than the first IR reflecting layer comprising silver.

28. The coated article of claim 25, wherein said coated article has a visible transmission of from about 20-42% measured monolithically.

29. The coated article of claim 25, wherein the coated article is heat treated and has a glass side reflective $\Delta E^*$ value of no greater than 4.6 due to the heat treatment.

30. A method of making a coated article including a coating supported by a glass substrate, the method comprising:
   sputter-depositing first and second infrared (IR) reflecting layers comprising silver, the first IR reflecting layer being located closer to the glass substrate than is the second IR reflecting layer;

sputter-depositing a first contact layer comprising NiCr located over and directly contacting the first IR reflecting layer comprising silver;

sputter-depositing a dielectric layer comprising silicon nitride located over and directly contacting the first contact layer comprising NiCr;

sputter-depositing a second contact layer comprising NiCr located over and directly contacting the layer comprising silicon nitride, the second IR reflecting layer comprising silver located over and directly contacting the second contact layer comprising NiCr; and wherein the second IR reflecting layer comprising silver is at least 10 angstroms (Å) thinner than the first IR reflecting layer comprising silver, and wherein the coated article has a visible transmission of no greater than 50% measured monolithically.

\* \* \* \* \*